United States Patent
Akiyama

(10) Patent No.: US 8,384,323 B2
(45) Date of Patent: Feb. 26, 2013

(54) MOTOR MAGNETIC-POLE-POSITION ESTIMATING APPARATUS

(75) Inventor: Masahiko Akiyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 331 days.

(21) Appl. No.: 12/968,296

(22) Filed: Dec. 15, 2010

(65) Prior Publication Data

US 2011/0175560 A1 Jul. 21, 2011

(30) Foreign Application Priority Data

Jan. 15, 2010 (JP) .................................. 2010-007019

(51) Int. Cl.
*H02P 21/00* (2006.01)
(52) U.S. Cl. ................................... 318/400.02; 318/727
(58) Field of Classification Search .................. 318/727, 318/400.32, 400.02, 400.34, 800
See application file for complete search history.

(56) References Cited

U.S. PATENT DOCUMENTS

| | | | | |
|---|---|---|---|---|
| 5,463,299 | A * | 10/1995 | Futami et al. ................. | 318/618 |
| 5,608,300 | A | 3/1997 | Kawabata et al. | |
| 6,396,229 | B1 * | 5/2002 | Sakamoto et al. ....... | 318/400.02 |
| 6,670,784 | B2 * | 12/2003 | Odachi et al. ................ | 318/700 |
| 7,345,442 | B2 * | 3/2008 | Ta et al. ........................ | 318/432 |
| 7,679,308 | B2 | 3/2010 | Tomigashi | |
| 7,893,639 | B2 * | 2/2011 | Tomigashi ............... | 318/400.21 |

FOREIGN PATENT DOCUMENTS

| | | |
|---|---|---|
| JP | 07-177788 | 7/1995 |
| JP | 2000-23498 | 1/2000 |
| JP | 2001-251889 | 9/2001 |
| JP | 2008-011616 | 1/2008 |

OTHER PUBLICATIONS

Japanese Office Action for corresponding JP Application No. 2010-007019, Dec. 20, 2011.

* cited by examiner

*Primary Examiner* — Rina Duda
(74) *Attorney, Agent, or Firm* — Ditthavong Mori & Steiner, P.C.

(57) ABSTRACT

A motor magnetic-pole-position estimating apparatus includes a command voltage output device and a current detector. A model-current calculator is configured to calculate a model current corresponding to a voltage equation for a predetermined model of a motor based on a command voltage and an actual current. A current-difference calculator is configured to calculate a current difference between the model current and the actual current. Each of first and second magnetic-pole-position-difference calculators is configured to calculate a magnetic-pole-position difference between an actual magnetic-pole position of the motor and an estimated or designated magnetic-pole position based on the current difference depending on whether or not a rotation speed of the motor is lower than a predetermined value. A magnetic-pole-position calculation device is configured to calculate the magnetic-pole position of the motor based on the magnetic-pole-position difference calculated by the first or second magnetic-pole-position-difference calculator.

5 Claims, 5 Drawing Sheets

MOTOR MAGNETIC-POLE-POSITION ESTIMATING APPARATUS

CROSS-REFERENCE TO RELATED APPLICATIONS

The present application claims priority under 35 U.S.C. §119 to Japanese Patent Application No. 2010-007019, filed Jan. 15, 2010, entitled "MOTOR MAGNETIC-POLE-POSITION ESTIMATING APPARATUS". The contents of this application are incorporated herein by reference in their entirety.

BACKGROUND OF THE INVENTION

1. Field of the Invention

The present invention relates to a motor magnetic-pole-position estimating apparatus.

2. Description of the Related Art

A conventionally known apparatus for, for example, a synchronous motor having saliency is an apparatus that calculates a phase difference by using that an induced voltage changes in accordance with a phase, based on a voltage equation of control axes (dc-qc coordinate axes) having a phase difference with respect to dq coordinate axes of real axes, and calculates the phase of the control axes from the calculation result (for example, see Japanese Patent Laid-Open No. 2001-251889).

Unfortunately, the apparatus according to the conventional technique cannot calculate the phase difference at a low rotation speed including a situation in which the motor is stopped. The phase difference has to be calculated by another operation method.

Owing to this, for example, the apparatus may include a plurality of arithmetically operating devices that calculate phase differences by a plurality of different operation methods, so that the plurality of arithmetically operating devices are switched in accordance with the rotation speed of the motor to calculate a phase difference. However, apparatus configuration may be complicated, and operation load increases, resulting in that chattering occurs when the plurality of arithmetically operating devices are switched.

SUMMARY OF THE INVENTION

According to one aspect of the present invention, a motor magnetic-pole-position estimating apparatus includes a command voltage output device, a current detector, a model-current calculator, a current-difference calculator, first and second magnetic-pole-position-difference calculators, and a magnetic-pole-position calculation device. The command voltage output device is configured to output a command voltage to apply current to a motor. The current detector is configured to detect an actual current applied to the motor and to output a detection result. The model-current calculator is configured to calculate a model current corresponding to a voltage equation for a predetermined model of the motor based on the command voltage and the actual current, and configured to output a calculation result. The current-difference calculator is configured to calculate a current difference between the model current and the actual current. The first and second magnetic-pole-position-difference calculators are configured to perform different operations. Each of the first and second magnetic-pole-position-difference calculators is configured to calculate a magnetic-pole-position difference between an actual magnetic-pole position of the motor and an estimated or designated magnetic-pole position based on the current difference depending on whether or not a rotation speed of the motor is lower than a predetermined value. The magnetic-pole-position calculation device is configured to calculate the magnetic-pole position of the motor based on the magnetic-pole-position difference calculated by the first or second magnetic-pole-position-difference calculator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
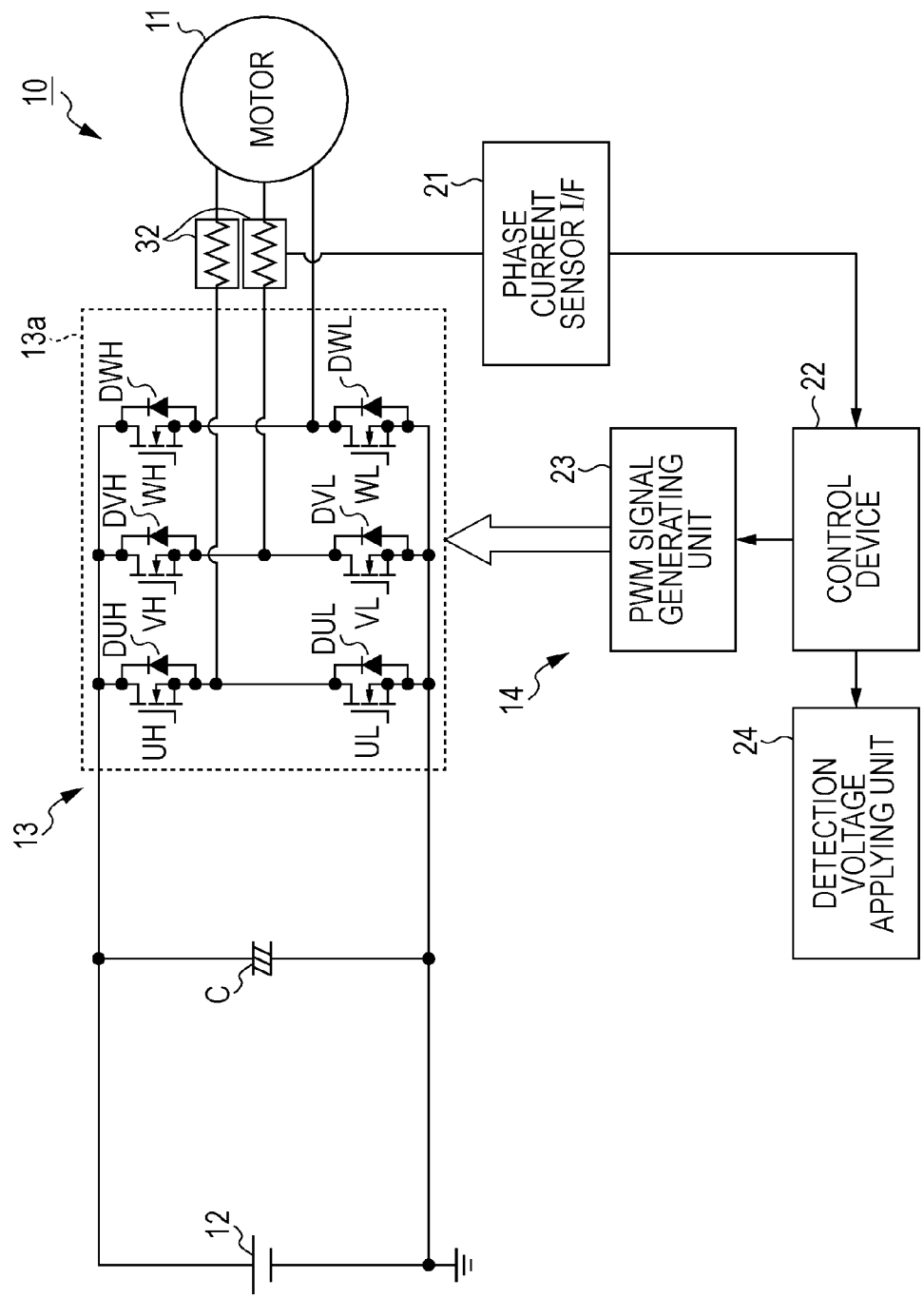
FIG. 1 is a configuration diagram showing a motor magnetic-pole-position estimating apparatus according to an embodiment of the present invention.

A motor magnetic-pole-position estimating apparatus according to an embodiment of the present invention will be described below with reference to the attached drawings, wherein like reference numerals designate corresponding or identical elements throughout the various drawings.

A motor magnetic-pole-position estimating apparatus 10 according to this embodiment (hereinafter, merely referred to as magnetic-pole-position estimating apparatus 10) estimates, for example, a magnetic-pole position (i.e., a rotation angle of a magnetic pole of a rotor from a predetermined reference rotation position) of a three-phase alternating-current brushless DC motor 11 (hereinafter, merely referred to as motor 11). The motor 11 includes a rotor (not shown) having a permanent magnet used as a field magnet of the motor 11, and a stator (not shown) that generates a rotation magnetic field for rotating the rotor. For example, the magnetic-pole-position estimating apparatus 10 includes an inverter 13 whose direct-current power supply is a battery 12, and a motor control device 14 as shown in FIG. 1.

The three-phase (including, for example, U-phase, V-phase, and W-phase) alternating-current motor 11 is driven by the inverter 13 in response to a control command that is output from the motor control device 14.

The inverter 13 includes a bridge circuit 13a having a plurality of switching elements (for example, metal oxide semiconductor field-effect transistors, MOSFETs) that are connected by bridge connection, and a smoothing capacitor C. The bridge circuit 13a is driven by a signal that is modulated by pulse-width modulation (PWM).

The bridge circuit 13a includes, for example, high-side and low-side U-phase transistors UH and UL, high-side and low-side V-phase transistors VH and VL, and high-side and low-side W-phase transistors WH and WL. The transistors form pairs respectively for the phases, and are connected by bridge connection. Drains of the transistors UH, VH, and WH are connected to a positive terminal of the battery 12 and form a high-side arm. Sources of the transistors UL, VL, and WL are connected to a grounded negative terminal of the battery 12 and form a low-side arm. Sources of the transistors UH, VH, and WH of the high-side arm are respectively connected to drains of the transistors UL, VL, and WL of the low-side arm on the phase basis. Diodes DUH, DUL, DVH, DVL, DWH, and DWL are respectively connected to the transistors UH, UL, VH, VL, WH, and WL on the transistor basis, at positions between the drains and the sources of these transistors in the forward directions from the sources to the drains.

The inverter 13 switches the state of each of the transistors UH, VH, WH, UL, VL, and WL, which form the pairs respectively for the phases, between ON (conducting) and OFF (cutoff), in response to a gate signal (or PWM signal). The gate signal is a switching command that is output from the motor control device 14, for example, when the motor 11 is driven and that is input to each of the transistors UH, VH, WH, UL, VL, and WL. A direct-current power supplied from the battery 12 is converted into three-phase alternating-current powers, and the powers are successively commutated to three-phase stator windings of the motor 11. Accordingly, alternating-current U-phase current Iu, V-phase current Iv, and W-phase current Iw are applied respectively to the stator windings of the three phases.

Though described later, the motor control device 14 performs feedback control (vector control) of electric current on $\gamma$-$\delta$ coordinates that define rotation rectangular coordinates. The motor control device 14 arithmetically operates a command $\gamma$-axis current I$\gamma$c and a command $\delta$-axis current I$\delta$c, calculates voltage commands Vu, Vv, and Vw of the respective phases based on the command $\gamma$-axis current I$\gamma$c and the command $\delta$-axis current I$\delta$c, and outputs PWM signals, which are gate signals, for the inverter 13 in accordance with the voltage commands Vu, Vv, and Vw of the respective phases. The motor control device 14 performs control such that deviations between a $\gamma$-axis current I$\gamma$ and a $\delta$-axis current I$\delta$ that are obtained by converting the currents Iu, Iv, and Iw of the respective phases, which are actually supplied from the inverter 13 to the motor 11, into currents on the $\gamma$-$\delta$ coordinates, and the command $\gamma$-axis current I$\gamma$c and the command $\delta$-axis current I$\delta$c become zero.

For example, the motor control device 14 includes a phase current sensor interface (I/F) 21, a control device 22, a PWM signal generating unit 23, and a detection voltage applying unit 24.

The phase current sensor I/F 21 is connected to phase current sensors 32 that are arranged between the bridge circuit 13a of the inverter 13 and the motor 11 and detect phase currents of at least two phases (for example, U-phase current and V-phase current) from among the currents of the three phases. The phase current sensor I/F 21 receives detection signals output from the phase current sensors 32 and outputs the detection signals to the control device 22.

Figure 2:
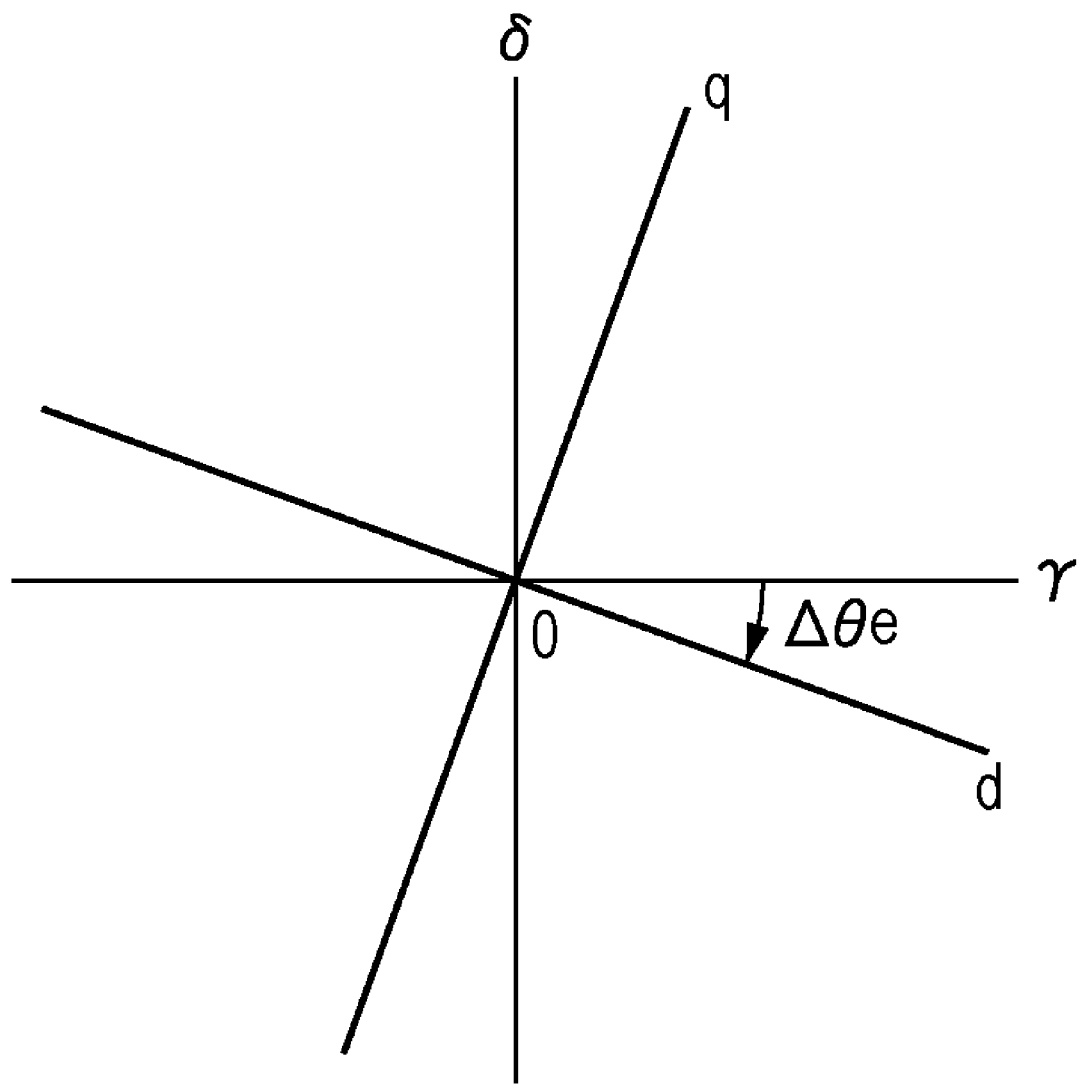
FIG. 2 illustrates an example of γ-δ axes and d-q axes of rotation rectangular coordinates according to the embodiment of the present invention.

For example, as shown in FIG. 2, the control device 22 sets the $\gamma$-$\delta$ axes of the rotation rectangular coordinates with respect to the d-q axes of the rotation rectangular coordinates actually provided for the motor 11. The $\gamma$-$\delta$ axes have a phase difference $\Delta\theta$e, which is a difference between an actual rotation angle and an estimated or designated rotation angle, and also have a rotation speed $\omega$e. The control device 22 performs feedback control (vector control) for the currents on the $\gamma$-$\delta$ coordinates.

The control device 22 generates the command $\gamma$-axis current I$\gamma$c and the command $\delta$-axis current I$\delta$c, calculates the voltage commands Vu, Vv, and Vw of the respective phases based on the command $\gamma$-axis current I$\gamma$c and the command $\delta$-axis current I$\delta$c, and outputs the voltage commands Vu, Vv, and Vw of the respective phases to the PWM signal generating unit 23.

The control device 22 also performs feedback control (vector control) such that deviations between the $\gamma$-axis current I$\gamma$ and the $\delta$-axis current I$\delta$, which are obtained by converting the currents Iu, Iv, and Iw of the respective phases corresponding to the detection signals output from the phase current sensors 32 into the currents on the $\gamma$-$\delta$ coordinates, and the command $\gamma$-axis current I$\gamma$c and the command $\delta$-axis current I$\delta$c become zero. The operation by the control device 22 will be described in detail later.

To apply sinusoidal currents to the stator windings of the three phases, the PWM signal generating unit 23 compares the phase voltage commands Vu, Vv, and Vw of the respective phases with carrier signals such as triangular waves, and generates gate signals (or PWM signals) for driving the respective transistors UH, VH, WH, UL, VL, and WL of the inverter 13 such that the transistors are turned ON or OFF. When the inverter 13 switches the state of each of the transistors, which form the pairs respectively for the three phases, between ON (conducting) and OFF (cutoff), the direct-current power supplied from the battery 12 is converted into the alternating-current powers of the three phases, and the powers are successively commutated to the stator windings of the three phases of the motor 11. Accordingly, the alternating-current U-phase current Iu, V-phase current Iv, and W-phase current Iw are applied respectively to the stator windings of the three phases.

The detection voltage applying unit 24 outputs a $\gamma$-axis detection voltage Vh$\gamma$ and a $\delta$-axis detection voltage Vh$\delta$, which are formed of, for example, pulse voltages with a predetermined frequency or sinusoidal voltages with a high frequency, as voltages that are superposed on a $\gamma$-axis voltage command value V$\gamma$c and a $\delta$-axis voltage command value V$\delta$c output from the a current control unit 43 (described later) of the control device 22, for example, during magnetic-pole-position-error estimating processing when the motor 11 is rotated at a speed in a low-speed range.

Figure 3:
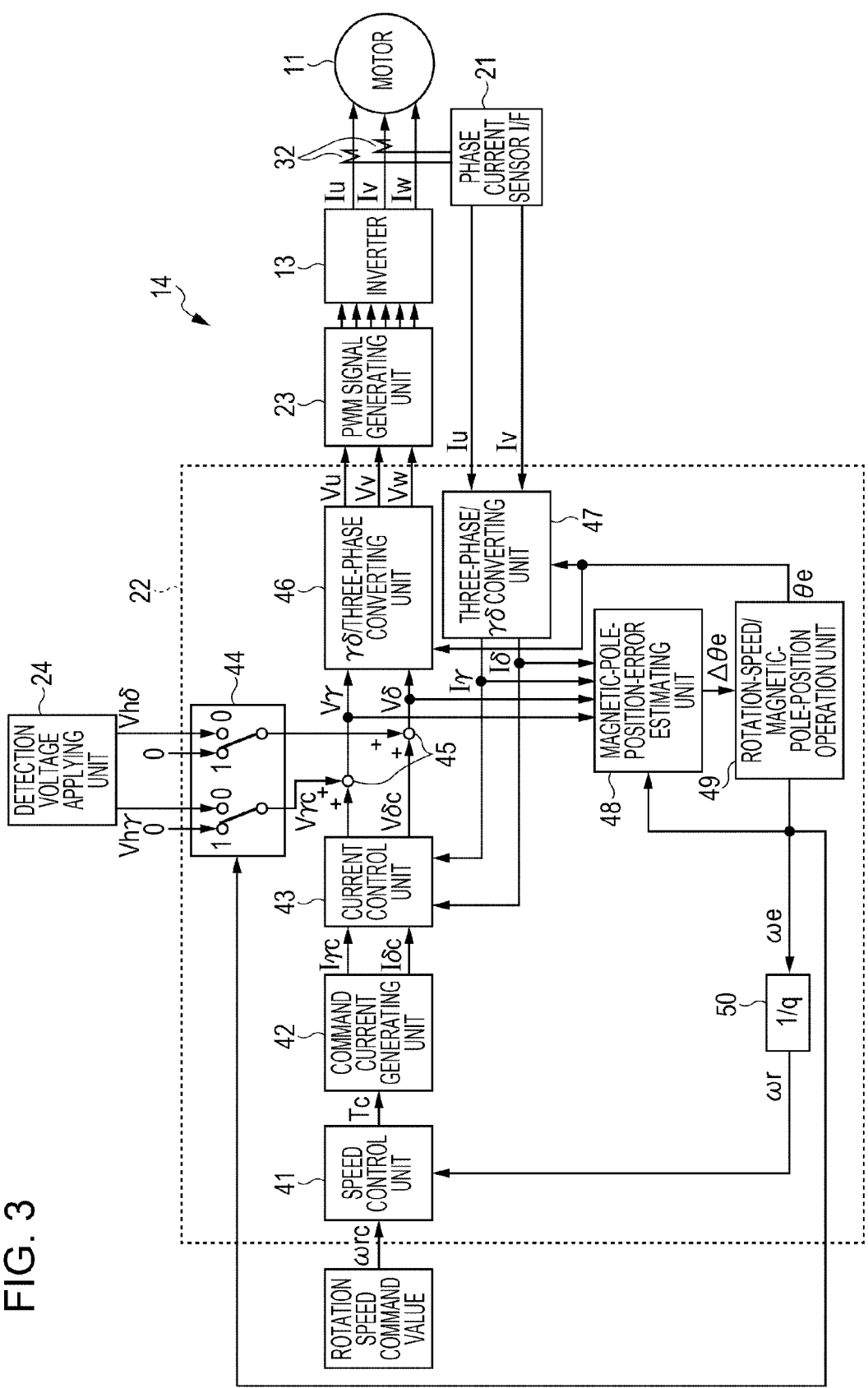
FIG. 3 is a configuration diagram showing the motor magnetic-pole-position estimating apparatus according to the embodiment of the present invention.

For example, as shown in FIG. 3, the control device 22 includes a speed control unit 41, a command current generating unit 42, a current control unit 43, a application voltage switching unit 44, a voltage adder unit 45, a $\gamma\delta$/three-phase converting unit 46, a three-phase/$\gamma\delta$ converting unit 47, a magnetic-pole-position-error estimating unit 48, a rotation-speed/magnetic-pole-position operation unit 49, and an electrical-angle/mechanical-angle converting unit 50.

The speed control unit 41 performs close-loop control, for example, in accordance with a rotation speed $\omega$r (mechanical angle) that is output from the electrical-angle/mechanical-angle converting unit 50, based on a rotation-speed command value $\omega$rc input from the outside. Thus, the speed control unit 41 arithmetically operates a torque command Tc and outputs the operation result.

Alternatively, the control device 22 may include a torque control unit that performs torque control (close-loop control etc.) in accordance with a torque output from the motor 11, and may execute that torque control, instead of the speed control unit 41.

The command current generating unit 42 arithmetically operates the command γ-axis current Iγc and the command δ-axis current Iδc based on the torque command Tc output from the speed control unit 41, and outputs the operation result.

The current control unit 43 calculates a deviation ΔIγ between the command γ-axis current Iγc output from the command current generating unit 42 and the γ-axis current Iγ output from the three-phase/γδ converting unit 47, and also calculates a deviation ΔIδ between the command δ-axis current Iδc output from the command current generating unit 42 and the δ-axis current Iδ output from the three-phase/γδ converting unit 47. The current control unit 43 performs control to amplify the deviation ΔIγ and calculate the γ-axis voltage command value Vγc, and control to amplify the deviation ΔIδ and calculate the δ-axis voltage command value Vδc, for example, by proportional-integral (PI) operation. Then, the current control unit 43 outputs the γ-axis voltage command value Vγc and the δ-axis voltage command value Vδc.

The application voltage switching unit 44 switches an application voltage output from the application voltage switching unit 44 in accordance with a rotation-speed estimated value ωe of the motor 11 output from the rotation-speed/magnetic-pole-position operation unit 49.

For example, if the rotation-speed estimated value ωe is a predetermined value or smaller and if the motor 11 is rotated at a speed in the low-speed range, the application voltage switching unit 44 sets a flag value of a switch flag to "0," and outputs the γ-axis detection voltage Vhγ and the δ-axis detection voltage Vhδ output from the detection voltage applying unit 24, as application voltages. In contrast, for example, if the rotation-speed estimated value ωe is larger than the predetermined value and if the motor 11 is rotated at a speed in a high-speed range, the application voltage switching unit 44 sets the flag value of the switch flag to "1," and outputs zero as the application voltages.

The voltage adder unit 45 adds the γ-axis voltage command value Vγc and the δ-axis voltage command value Vδc output from the current control unit 43, with the application voltages output from the application voltage switching unit 44 (i.e., the γ-axis detection voltage Vhγ and the δ-axis detection voltage Vhδ output from the detection voltage applying unit 24, or zero), and input the added values to the magnetic-pole-position-error estimating unit 48, as the γ-axis voltage command value Vγ and the δ-axis voltage command value Vδ.

The γδ/three-phase converting unit 46 converts the γ-axis voltage command value Vγ and the δ-axis voltage command value Vδ on the γ-δ coordinates into the U-phase voltage command Vu, the V-phase voltage command Vv, and the W-phase voltage command Vw, which are voltage command values on the three-phase alternating-current coordinates (coordinates at rest), based on a magnetic-pole-position estimated value θe of the motor 11, the value which is output from a rotation-speed/magnetic-pole-position operation unit 49.

The three-phase/γδ converting unit 47 uses current values of phase currents of two phases (for example, the phase currents Iu and Iv), which are obtained by the detection signals of the phase currents Iu and Iv output from the phase current sensor I/F 21, and calculates a phase current of the other phase (for example, the W-phase current Iw) from the phase currents of the two phases, by using that the total sum of the current values of the phase currents at the same timing is zero. Then, the three-phase/γδ converting unit 47 converts the phase currents Iu, Iv, and Iw into the γ-axis current Iγ and the δ-axis current Iδ on the γ-δ coordinates, based on the magnetic-pole-position estimated value θe of the motor 11, the value which is output from the rotation-speed/magnetic-pole-position operation unit 49.

The magnetic-pole-position-error estimating unit 48 estimates the phase difference Δθe, for example, by using that an induced voltage generated by the motor 11 or an inductance of the motor 11 during the rotation of the motor 11 changes depending on the magnetic-pole position, based on the γ-axis voltage command value Vγ and the δ-axis voltage command value Vδ output from the voltage adder unit 45 and the γ-axis current Iγ and the δ-axis current Iδ output from the three-phase/γδ converting unit 47.

The magnetic-pole-position-error estimating unit 48 estimates the phase difference Δθe, for example, by using that the induced voltage generated by the motor 11 changes depending on the magnetic-pole position at a speed in the high-speed range, or the inductance changes depending on the magnetic-pole position at a speed in the low-speed range while the γ-axis detection voltage Vhγ and the δ-axis detection voltage Vhδ output from the detection voltage applying unit 24 are applied to the γ-axis voltage command value Vγc and the δ-axis voltage command value Vδc output from the current control unit 43 (namely, saliency of the inductance).

Figure 4:
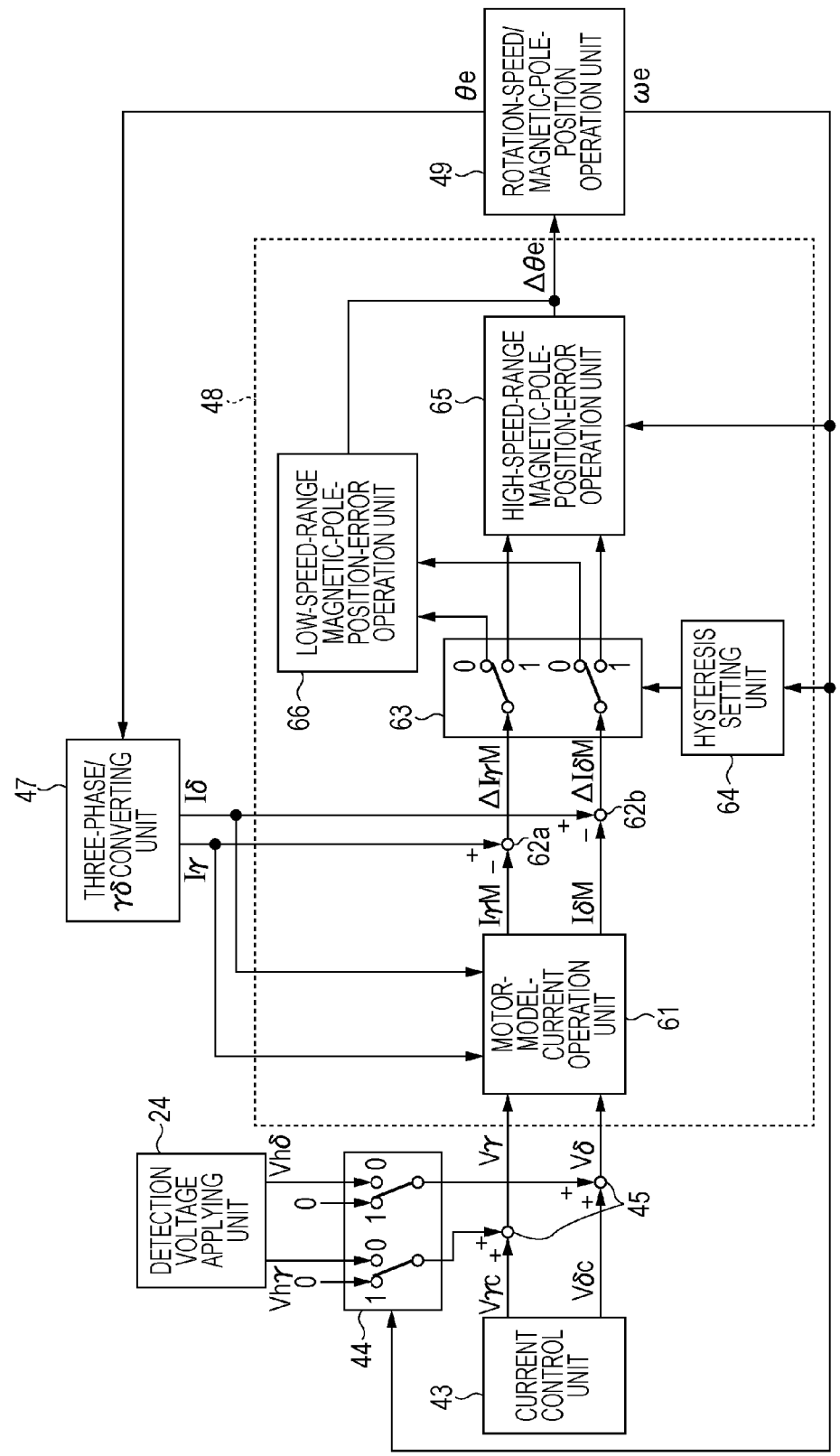
FIG. 4 is a configuration diagram showing a magnetic-pole-position-error estimating unit shown in FIG. 3.

For example, as shown in FIG. 4, the magnetic-pole-position-error estimating unit 48 includes a motor-model-current operation unit 61, a γ-axis current deviation calculating unit 62a and a δ-axis current deviation calculating unit 62b, an output switching unit 63, a hysteresis setting unit 64, a high-speed-range magnetic-pole-position-error operation unit 65, and a low-speed-range magnetic-pole-position-error operation unit 66.

The motor-model-current operation unit 61 uses the γ-axis voltage command value Vγ and the δ-axis voltage command value Vδ output from the voltage adder unit 45 and the γ-axis current Iγ and the δ-axis current Iδ output from the three-phase/γδ converting unit 47, calculates a γ-axis model current IγM and a δ-axis model current IδM by a voltage equation for a predetermined model of the motor 11, and outputs the model currents IγM and IδM.

The motor-model-current operation unit 61 is configured such that the voltage equation for the predetermined model of the motor 11 is commonly used if the low-speed-range magnetic-pole-position-error operation unit 66 estimates the phase difference Δθe when the motor 11 is rotated at a speed in the low-speed range and if the high-speed-range magnetic-pole-position-error operation unit 65 estimates the Δθe when the motor 11 is rotated at a speed in the high-speed range.

The voltage equation for the predetermined model of the motor 11 will be described below.

The voltage equation of the motor 11 for the γ-δ coordinate system (i.e., the voltage equation for a continuous time) is expressed by the γ-axis voltage command value Vγ and the δ-axis voltage command value Vδ, a winding resistance R, a differential operator p, a d-axis inductance Ld and a q-axis inductance Lq, the phase difference Δθe, the rotation-speed estimated value ωe, a d-axis current Id and a q-axis current Iq, and a magnetic-flux component (induced voltage constant) phi of the permanent magnet as written in, for example, Expression 1.

$$\begin{bmatrix} V\gamma \\ V\delta \end{bmatrix} = \begin{bmatrix} R+p\cdot Ld & -(-Ld\cdot p\cdot \Delta\theta e + \omega e\cdot Lq) \\ (-Ld\cdot p\cdot \Delta\theta e + \omega e\cdot Lq) & R+p\cdot Ld \end{bmatrix} \begin{bmatrix} I\gamma \\ I\delta \end{bmatrix} + Eex\begin{bmatrix} -\sin\Delta\theta e \\ \cos\Delta\theta e \end{bmatrix} \quad (1)$$
$$Eex = (Ld - Lq)(\omega e\cdot Id - p\cdot Iq) + \omega e\cdot \phi$$

In Expression 1, if the term relating to the magnetic-pole position and the rotation speed is deleted as a disturbance, a simple voltage equation of the motor 11 is written like Expression 2.

$$p\begin{bmatrix} I\gamma \\ I\delta \end{bmatrix} = \begin{bmatrix} -\frac{R}{Ld} & 0 \\ 0 & -\frac{R}{Ld} \end{bmatrix}\begin{bmatrix} I\gamma \\ I\delta \end{bmatrix} + \begin{bmatrix} \frac{1}{Ld} & 0 \\ 0 & \frac{1}{Ld} \end{bmatrix}\begin{bmatrix} V\gamma \\ V\delta \end{bmatrix} \quad (2)$$

If Expression 2, which is the simple voltage equation for the continuous time, is discretized by, for example, the Euler's approximation, a discrete-time state equation is written like Expression 3 with a single period Ts of a carrier signal and a certain natural number n.

In Expression 3, the certain natural number n is, for example, an index corresponding to a carrier top at the mountain-side of the carrier signal with a certain control period.

In Expression 3, it is assumed that the (n)-th values of the γ-axis current Iγ and the δ-axis current Iδ output from the three-phase/γδ converting unit 47, namely, a γ-axis current Iγ[n] and a δ-axis current Iδ[n] serve as a γ-axis model current IγM[n] and a δ-axis model current IδM[n].

$$\begin{bmatrix} I\gamma M[n] \\ I\delta M[n] \end{bmatrix} = \left(1 - \frac{R}{Ld}Ts\right)\begin{bmatrix} I\gamma[n-1] \\ I\delta[n-1] \end{bmatrix} + \frac{Ts}{Ld}\begin{bmatrix} V\gamma[n-1] \\ V\delta[n-1] \end{bmatrix} \quad (3)$$

The motor-model-current operation unit 61 uses the (n−1)-th values of the γ-axis voltage command value Vγ and the δ-axis voltage command value Vδ output from the voltage adder unit 45, namely, a γ-axis voltage command value Vγ[n−1] and a δ-axis voltage command value Vδ[n−1], and the (n−1)-th values of the γ-axis current Iγ and the δ-axis current Iδ output from the three-phase/γδ converting unit 47, namely, a γ-axis current Iγ[n−1] and a δ-axis current Iδ[n−1], calculates the γ-axis model current IγM[n] and the δ-axis model current IδM[n] as the (n)-th values by the voltage equation for the predetermined model of the motor 11 written in Expression 3, and outputs the γ-axis model current IγM[n] and the δ-axis model current IδM[n].

Also, if the voltage equation of the motor 11 (that is, the voltage equation for the continuous time) on the d-q coordinate system is written by using an extension induced voltage Eex depending on the magnetic-pole position, the voltage equation is written like Expression 4.

In Expression 4, if the motor 11 is rotated at a speed in the low-speed rage (or if the motor 11 is stopped), the angular speed may be estimated as zero (i.e., rotation-speed estimated value ωe≅0) and may be negligible. Further, if the d-axis is replaced with the γ-axis, the q-axis is replaced with the δ-axis for the currents and the voltage command values of the respective axes, and the term relating to the extension induced voltage Eex depending on the magnetic-pole position and the rotation speed is deleted as a disturbance, the simple voltage equation of the motor 11 is written as Expression 2 like the above-described embodiment.

Accordingly, the voltage equation for the predetermined model of the motor 11 when the motor 11 is rotated at a speed in the low-speed range or when the motor 11 is stopped becomes a discrete-time state equation written like Expression 3.

$$\begin{bmatrix} Vd \\ Vq \end{bmatrix} = \begin{bmatrix} R+p\cdot Ld & -(\omega e\cdot Lq) \\ (\omega e\cdot Lq) & R+p\cdot Ld \end{bmatrix}\begin{bmatrix} Id \\ Iq \end{bmatrix} + Eex\begin{bmatrix} 0 \\ 1 \end{bmatrix} \quad (4)$$
$$Eex = (Ld - Lq)(\omega e\cdot Id - p\cdot Iq) + \omega e\cdot \phi$$

The γ-axis current deviation calculating unit 62a and the δ-axis current deviation calculating unit 62b calculate current deviations ΔIγM[n] and ΔIδM[n] between the γ-axis current Iγ[n] and the δ-axis current Iδ[n] output from the three-phase/γδ converting unit 47 and the model currents IγM[n] and IδM[n] output from the motor-model-current operation unit 61 at the same timing, i.e., at the (n)-th top at the mountain-side of the carrier signal, and outputs the current deviations ΔIγM[n] and ΔIδM[n], for example, as shown in Expression 5.

$$\begin{bmatrix} \Delta I\gamma M[n] \\ \Delta I\delta M[n] \end{bmatrix} = \begin{bmatrix} I\gamma[n] \\ I\delta[n] \end{bmatrix} - \begin{bmatrix} I\gamma M[n] \\ I\delta M[n] \end{bmatrix} \quad (5)$$

The output switching unit 63 selects one of the high-speed-range magnetic-pole-position-error operation unit 65 and the low-speed-range magnetic-pole-position-error operation unit 66 in accordance with the flag value of the switch flag output from the hysteresis setting unit 64, and switches the output target for the current deviations ΔIγM[n] and ΔIδM[n] output from the γ-axis current deviation calculating unit 62a and the δ-axis current deviation calculating unit 62b.

If the flag value of the switch flag is "1," the output switching unit 63 outputs the current deviations ΔIγM[n] and ΔIδM[n] to the high-speed-range magnetic-pole-position-error operation unit 65. In contrast, if the flag value of the switch flag is "0," the output switching unit 63 outputs the current deviations ΔIγM[n] and ΔIδM[n] to the low-speed-range magnetic-pole-position-error operation unit 66.

The hysteresis setting unit 64 sets the hysteresis in accordance with the rotation speed of the motor 11 (for example, the rotation-speed estimated value ωe of the motor 11 output from the rotation-speed/magnetic-pole-position operation unit 49), and sets the flag value of the switch flag to "0" or "1."

Figure 5:
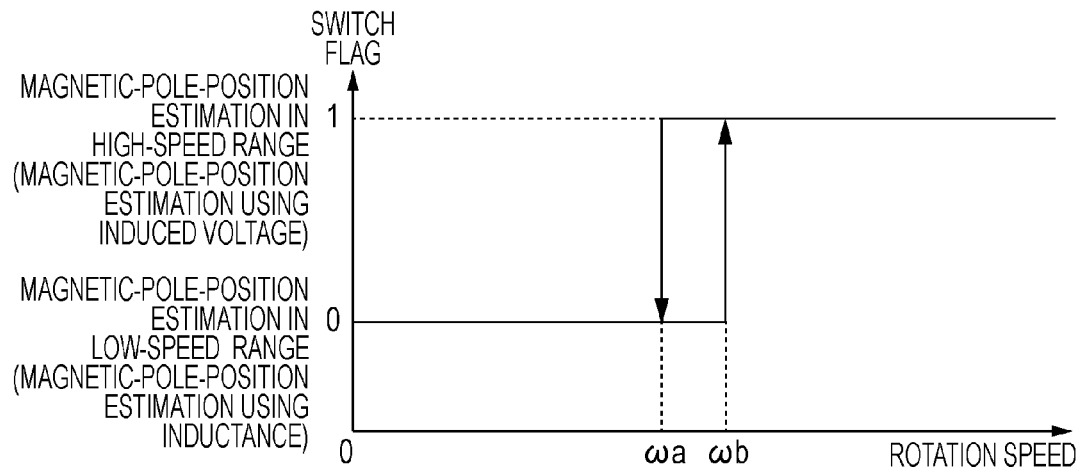
FIG. 5 illustrates an example of a change of a switch flag in accordance with a rotation speed according to the embodiment of the present invention.

The hysteresis setting unit 64 sets the hysteresis when the flag value of the switch flag is switched depending on whether or not the rotation speed of the motor 11 is a predetermined value or higher. For example, referring to FIG. 5, when the rotation speed of the motor 11 increases in the state in which the flag value of the switch flag is set to "0," the flag value of the switch flag is switched from "0" to "1" if the rotation speed becomes a second predetermined rotation speed ωb (>ωa) or higher, the second predetermined rotation speed ωb which is higher than a first predetermined rotation speed ωa. In contrast, when the rotation speed of the motor 11 decreases in the state in which the flag value of the switch flag is set to "1," the flag value of the switching value is switched from "1" to "0" if the rotation speed becomes the first predetermined rotation speed ωa (<ωb) or higher.

The high-speed-range magnetic-pole-position-error operation unit 65 calculates the phase difference Δθe, for example, by Expression 6.

Expression 6 is calculated by using the discrete-time state equation obtained by discretizing the voltage equation of the motor 11 written in Expression 1 and the voltage equation for the predetermined model of the motor 11 written in Expression 3 (that is, the discrete-time equation obtained by discretizing Expression 2 that is the simple voltage equation of the motor 11).

With Expression 6, for example, a (n)-th phase difference Δθe is calculated from the current deviations ΔIγM[n] and ΔIδM[n] that are the (n)-th values output from the γ-axis current deviation calculating unit 62a and the δ-axis current deviation calculating unit 62b, a rotation-speed estimated value ωe[n−1] that is the (n−1)-th value, the γ-axis current Iγ[n−1] and the δ-axis current Iδ[n−1] that are the (n−1)-th values output from the three-phase/γδ converting unit 47, and a predetermined electrical circuit constant of the motor 11 (that is, the winding resistance R, the inductances Ld and Lq, and the single period Ts of the carrier signal).

$$\Delta\theta e = \tan^{-1} \frac{\Delta I\gamma M[n] - \omega e[n-1] \cdot \frac{Lq}{Ld} \cdot Ts \cdot I\delta[n-1]}{-\left(\Delta I\delta M[n] + \omega e[n-1] \cdot \frac{Lq}{Ld} \cdot Ts \cdot I\gamma[n-1]\right)} \quad (6)$$

The low-speed-range magnetic-pole-position-error operation unit 66 calculates the phase difference Δθe, for example, by Expression 7.

Expression 7 is calculated by using the voltage equation for the predetermined model of the motor 11 written in Expression 3 (that is, the discrete-time state equation obtained by discretizing Expression 2 that is the simple voltage equation of the motor 11), the discrete-time state equation based on Expression 4, and an expression of the extension induced voltage Eex based on the voltage equation (Expression 8) of the motor 11 on the γ-δ coordinate system.

The discrete-time state equation based on Expression 4 is obtained such that the voltage equation of the motor 11 obtained by replacing the d-axis with the γ-axis and replacing the q-axis with the δ-axis for the currents and the voltage command values of the respective axes is discretized while it is assumed that the motor 11 is rotated at a speed in the low-speed range (or the motor 11 is stopped) and hence the angular speed is zero and negligible (that is, rotation-speed estimated value ωe≅0).

The expression of the extension induced voltage Eex based on the voltage equation of Expression 8 is obtained by replacing the d-axis with the γ-axis and replacing the q-axis with the δ-axis for the currents and the voltage command values of the respective axes in Expression 4, while it is assumed that the motor 11 is rotated at a speed in the low-speed range (or the motor 11 is stopped) and the angular speed is zero and negligible (that is rotation-speed estimated value ωe≅0).

$$\Delta\theta e = \tan^{-1} \frac{\Delta I\gamma M[n](I\gamma[n] - I\gamma[n-1]) + \left\{\Delta I\delta M[n] + \frac{Lq-Ld}{Ld}(I\delta[n] - I\delta[n-1])\right\}(I\delta[n] - I\delta[n-1])}{\Delta I\gamma M[n](I\delta[n] - I\delta[n-1]) + \left\{\Delta I\delta M[n] + \frac{Lq-Ld}{Ld}(I\delta[n] - I\delta[n-1])\right\}(I\gamma[n] - I\gamma[n-1])} \quad (7)$$

$$\begin{bmatrix} V\gamma \\ V\delta \end{bmatrix} = \begin{bmatrix} R + p \cdot L\gamma - \omega e \cdot L\gamma\delta & p \cdot L\gamma\delta - \omega e \cdot L\delta \\ p \cdot L\gamma\delta + \omega e \cdot L\gamma & R + p \cdot L\delta + \omega e \cdot L\gamma\delta \end{bmatrix} \begin{bmatrix} I\gamma \\ I\delta \end{bmatrix} + \omega e \cdot \phi \begin{bmatrix} -\sin\Delta\theta e \\ \cos\Delta\theta e \end{bmatrix} \quad (8)$$

$$L\gamma = \frac{1}{2}\{(Ld + Lq) - (Lq - Ld)\cos 2\Delta\theta e\}$$

$$L\delta = \frac{1}{2}\{(Ld + Lq) - (Lq - Ld)\cos 2\Delta\theta e\}$$

$$L\gamma\delta = \frac{1}{2}(Lq - Ld)\sin 2\Delta\theta e$$

Also, the low-speed-range magnetic-pole-position-error operation unit 66 may calculate the phase difference Δθe by Expression 9 that is an approximate expression of Expression 7, for example, if the phase difference Δθe is small (Δθ≅0).

$$\Delta\theta e \approx \frac{L_d}{L_q - L_d} \frac{1}{T_s} \frac{1}{(I\gamma[n] - I\gamma[n-1])^2 + (I\delta[n] - I\delta[n-1])^2} \times \quad (9)$$

$$[\Delta I\gamma M[n](I\delta[n] - I\delta[n-1]) + \left\{\Delta I\delta M[n] + \frac{L_q - L_d}{L_d}(I\delta[n] - I\delta[n-1])\right\}(I\gamma[n] - I\gamma[n-1])]$$

The rotation-speed/magnetic-pole-position operation unit 49 performs phase synchronization processing by phase-locked loop (PLL) based on the phase difference Δθe output from the high-speed-range magnetic-pole-position-error operation unit 65 or the low-speed-range magnetic-pole-position-error operation unit 66.

Figure 6:
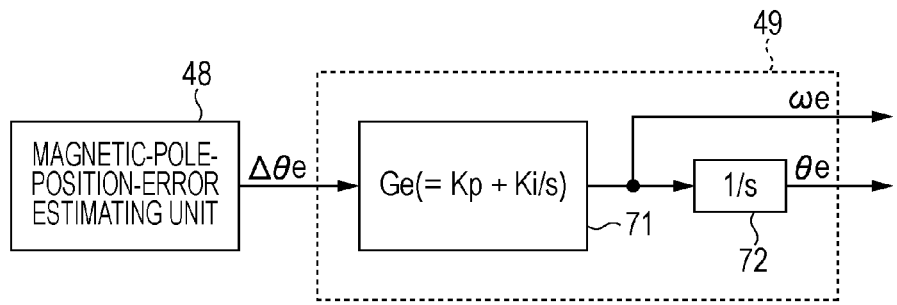
FIG. 6 is a configuration diagram showing a rotation-speed/magnetic-pole-position operation unit shown in FIG. 3.

The rotation-speed/magnetic-pole-position operation unit 49 includes a phase synchronization unit 71 and an integral operation unit 72, for example, as shown in FIG. 6.

The phase synchronization unit 71 performs, for example, proportional-integral (PI) operation as the phase synchronization processing. For example, based on a transfer function Ge(s) written in Expression 10, the phase synchronization unit 71 uses a proportional gain Kp and an integral gain Ki, arithmetically operates the rotation-speed estimated value ωe from the phase difference Δθe, for example, as written in Expression 11, and outputs the operation result.

$$Ge(s) = Kp + \frac{Ki}{s} \quad (10)$$

$$\omega e[n] = Kp \cdot \Delta\theta e[n] + Ki \cdot \sum \Delta\theta e[n] \quad (11)$$

The integral operation unit 72 arithmetically operates a magnetic-pole-position estimated value θe by integrating the rotation-speed estimated value ωe output from the phase synchronization unit 71, for example, as shown in Expression 12, and outputs the operation result.

$$\theta e[n] = \theta e[n-1] + Ts \cdot \omega e[n] \quad (12)$$

Figure 7:
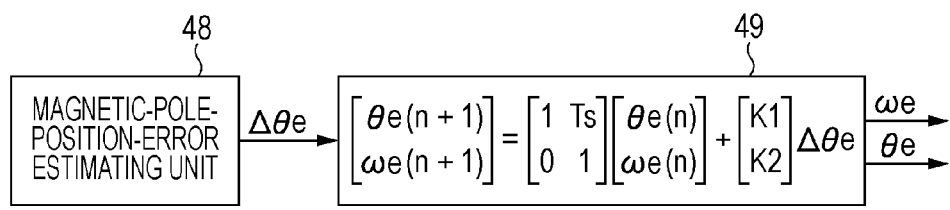
FIG. 7 is a configuration diagram showing a rotation-speed/magnetic-pole-position operation unit according to a modification of the embodiment of the present invention.

The operation of the rotation-speed/magnetic-pole-position operation unit 49 is not limited to the PI operation. The rotation-speed/magnetic-pole-position operation unit 49 may execute following operation processing with an observer of the same dimension which takes the phase difference Δθe as an input value, to arithmetically operate the rotation-speed estimated value ωe and the magnetic-position estimated value θe, like a first modification shown in FIG. 7 and written in Expression 13.

$$\begin{bmatrix} \theta e(n+1) \\ \omega e(n+1) \end{bmatrix} = \begin{bmatrix} 1 & Ts \\ 0 & 1 \end{bmatrix} \begin{bmatrix} \theta e(n) \\ \omega e(n) \end{bmatrix} + \begin{bmatrix} K1 \\ K2 \end{bmatrix} \Delta \theta e \qquad (13)$$

The electrical-angle/mechanical-angle converting unit 50 converts the rotation-speed estimated value ωe output from the rotation-speed/magnetic-pole-position operation unit 49 into a rotation speed ωr (mechanical angle) in accordance with the number q of pairs of poles of the motor 11, and outputs the rotation speed ωr (mechanical angle).

As described above, with the motor magnetic-pole-position estimating apparatus 10 according to this embodiment, the motor-model-current operation unit 61 calculates the model currents IγM and IδM by using the common state equation for the two high-speed-range magnetic-pole-position-error operation unit 65 and low-speed-range magnetic-pole-position-error operation unit 66 that perform the different operations and each calculate the phase difference Δθe depending on the rotation speed of the motor 11. Also, the rotation-speed/magnetic-pole-position operation unit 49 calculates the magnetic-pole position of the motor 11 by the common operation for the two high-speed-range magnetic-pole-position-error operation unit 65 and low-speed-range magnetic-pole-position-error operation unit 66.

Accordingly, as compared with, for example, a case in which the model currents IγM and IδM, and the phase difference Δθe are calculated by uncommon operations for the high-speed-range magnetic-pole-position-error operation unit 65 and the low-speed-range magnetic-pole-position-error operation unit 66, the apparatus configuration can be simplified, and the operation load can be decreased. Further, stability can be increased when the calculation is selected from the calculation for the phase difference Δθe by the high-speed-range magnetic-pole-position-error operation unit 65 and the calculation for the phase difference Δθe by the low-speed-range magnetic-pole-position-error operation unit 66 depending on whether or not the rotation speed of the motor 11 is lower than the predetermined value.

Further, since the calculation is selected from the calculation for the phase difference Δθe by the low-speed-range magnetic-pole-position-error operation unit 66 and the calculation for the phase difference Δθe by the high-speed-range magnetic-pole-position-error operation unit 65 depending on whether or not the rotation speed of the motor 11 is lower than the predetermined value, the magnetic-pole position (magnetic-pole position estimated value θe) of the motor 11 can be properly calculated. With the low-speed-range magnetic-pole-position-error operation unit 66, the magnetic-pole position can be calculated even when the motor 11 is stopped. With the high-speed-range magnetic-pole-position-error operation unit 65, the magnetic-pole position can be calculated without the application of a predetermined γ-axis detection voltage Vhγ or a δ-axis detection voltage Vhδ.

Further, since the hysteresis is provided for the selection of the calculation from the calculation for the phase difference Δθe by the low-speed-range magnetic-pole-position-error operation unit 66 and the calculation for the phase difference Δθe by the high-speed-range magnetic-pole-position-error operation unit 65 depending on whether or not the rotation speed of the motor 11 is lower than the predetermined value, chattering can be prevented from occurring when the calculation is selected.

In the above-described embodiment, a direct-current-side current sensor that detects a direct-current-side current Idc of the bridge circuit 13a of the inverter 13 may be provided between the bridge circuit 13a of the inverter 13 and the negative-pole terminal or the positive-pole terminal of the battery 12 as a second modification, instead of the phase current sensors 32. In this second modification, the phase currents are estimated based on a detection signal output from the direct-current-side current sensor and a gate signal input to the inverter 13 from the PWM signal generating unit 23, and the estimated phase currents are input to the three-phase/γδ converting unit 47. In this case, the voltage equation in Expression 3 may be synchronized at the same timing as the timing of the estimated values of the phase currents.

With the motor magnetic-pole-position estimating apparatus according to the embodiment of the present invention, the model-current calculator calculates the model current by using a common state equation for the first and second magnetic-pole-position-difference calculators that perform the different operations and each calculate the magnetic-pole-position difference depending on the rotation speed of the motor. Also, the magnetic-pole-position calculation device calculates the magnetic-pole position of the motor by a common operation for the two first and second magnetic-pole-position-difference calculators.

Accordingly, as compared with, for example, a case in which the model current and the magnetic-pole position of the motor are calculated by uncommon operations for the first and second magnetic-pole-position-difference calculators, the apparatus configuration can be simplified, and the operation load can be decreased. Further, stability can be increased when the calculation is selected from the calculation for the magnetic-pole-position difference by the first magnetic-pole-position-difference calculator and the calculation for the magnetic-pole-position difference by the second magnetic-pole-position-difference calculator depending on whether or not the rotation speed of the motor is lower than the predetermined value.

With the motor magnetic-pole-position estimating apparatus according to the embodiment of the present invention, since the calculation is selected from the calculation for the magnetic-pole-position difference by the first magnetic-pole-position-difference calculator and the calculation for the magnetic-pole-position difference by the second magnetic-pole-position-difference calculator depending on whether or not the rotation speed of the motor is lower than the predetermined value, the magnetic-pole position of the motor can be properly calculated. With the first magnetic-pole-position-difference calculator, the magnetic-pole position can be calculated even when the motor is stopped. With the second magnetic-pole-position-difference calculator, the magnetic-pole position can be calculated without application of a predetermined detection voltage.

With the motor magnetic-pole-position estimating apparatus according to the embodiment of the present invention, since the hysteresis is provided for selection of calculation from the calculation for the magnetic-pole-position difference by the first magnetic-pole-position-difference calculator and the calculation for the magnetic-pole-position difference by the second magnetic-pole-position-difference calculator depending on whether or not the rotation speed of the motor is lower than the predetermined value, chattering can be prevented from occurring when the calculation is selected.

Obviously, numerous modifications and variations of the present invention are possible in light of the above teachings. It is therefore to be understood that within the scope of the appended claims, the invention may be practiced otherwise than as specifically described herein.

What is claimed is:

1. A motor magnetic-pole-position estimating apparatus comprising:
    a command voltage output device configured to output a command voltage to apply current to a motor;
    a current detector configured to detect an actual current applied to the motor and to output a detection result;
    a model-current calculator configured to calculate a model current corresponding to a voltage equation for a predetermined model of the motor based on the command voltage and the actual current, and configured to output a calculation result;
    a current-difference calculator configured to calculate a current difference between the model current and the actual current;
    first and second magnetic-pole-position-difference calculators configured to perform different operations, each of the first and second magnetic-pole-position-difference calculators being configured to calculate a magnetic-pole-position difference between an actual magnetic-pole position of the motor and an estimated or designated magnetic-pole position based on the current difference depending on whether or not a rotation speed of the motor is lower than a predetermined value; and
    a magnetic-pole-position calculation device configured to calculate the magnetic-pole position of the motor based on the magnetic-pole-position difference calculated by the first or second magnetic-pole-position-difference calculator.

2. The motor magnetic-pole-position estimating apparatus according to claim 1,
    wherein the first magnetic-pole-position-difference calculator is configured to calculate the magnetic-pole-position difference based on that an inductance of the motor changes depending on the magnetic-pole position if the rotation speed of the motor is lower than the predetermined value, and
    wherein the second magnetic-pole-position-difference calculator is configured to calculate the magnetic-pole-position difference based on that an induced voltage of the motor changes depending on the magnetic-pole position if the rotation speed of the motor is the predetermined value or higher.

3. The motor magnetic-pole-position estimating apparatus according to claim 1, further comprising a hysteresis setting device that sets a hysteresis for a selection of a calculation from a calculation for the magnetic-pole-position difference by the first magnetic-pole-position-difference calculator and a calculation for the magnetic-pole-position difference by the second magnetic-pole-position-difference calculator depending on whether or not the rotation speed of the motor is lower than the predetermined value.

4. The motor magnetic-pole-position estimating apparatus according to claim 2, further comprising a hysteresis setting device that sets a hysteresis for a selection of a calculation from a calculation for the magnetic-pole-position difference by the first magnetic-pole-position-difference calculator and a calculation for the magnetic-pole-position difference by the second magnetic-pole-position-difference calculator depending on whether or not the rotation speed of the motor is lower than the predetermined value.

5. A motor magnetic-pole-position estimating apparatus comprising:
    command voltage output means for outputting a command voltage to apply current to a motor;
    current detection means for detecting an actual current applied to the motor and to output a detection result;
    model-current calculation means for calculating a model current corresponding to a voltage equation for a predetermined model of the motor based on the command voltage and the actual current, and configured to output a calculation result;
    current-difference calculation means for calculating a current difference between the model current and the actual current;
    first and second magnetic-pole-position-difference calculation means for performing different operations, each of the first and second magnetic-pole-position-difference calculation means being configured to calculate a magnetic-pole-position difference between an actual magnetic-pole position of the motor and an estimated or designated magnetic-pole position based on the current difference depending on whether or not a rotation speed of the motor is lower than a predetermined value; and
    magnetic-pole-position calculation means for calculating the magnetic-pole position of the motor based on the magnetic-pole-position difference calculated by the first or second magnetic-pole-position-difference calculator.

* * * * *